(12) United States Patent  
Zhu

(10) Patent No.: US 8,247,733 B2  
(45) Date of Patent: Aug. 21, 2012

(54) ARRANGEMENT FOR THE REPAIR OF THE BLADES OF BLISK DRUMS BY MEANS OF LASER DEPOSITION WELDING

(75) Inventor: Leping Zhu, Darmstadt (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 412 days.

(21) Appl. No.: 12/685,805

(22) Filed: Jan. 12, 2010

(65) Prior Publication Data

US 2010/0176097 A1  Jul. 15, 2010

(30) Foreign Application Priority Data

Jan. 12, 2009 (DE) .......................... 10 2009 004 661

(51) Int. Cl.
*B23K 26/14* (2006.01)
*B23K 26/34* (2006.01)
*B23P 6/00* (2006.01)
*B23P 6/04* (2006.01)

(52) U.S. Cl. ......... 219/121.63; 219/121.84; 29/888.021; 29/889.1; 29/889.23

(58) Field of Classification Search ............. 219/121.63, 219/121.84; 29/888.021, 889.1, 889.23
See application file for complete search history.

(56) References Cited

U.S. PATENT DOCUMENTS

| 5,038,014 | A | | 8/1991 | Pratt et al. |
| 5,160,822 | A | * | 11/1992 | Aleshin .................... 219/121.64 |
| 6,316,744 | B1 | | 11/2001 | Nowotny et al. |
| 7,259,353 | B2 | * | 8/2007 | Guo .......................... 219/121.63 |
| 7,472,478 | B2 | * | 1/2009 | Graham et al. .......... 29/888.021 |
| 8,006,380 | B2 | * | 8/2011 | Rawson et al. .............. 29/889.1 |
| 2005/0274010 | A1 | * | 12/2005 | Rawson et al. .............. 29/889.1 |
| 2006/0065650 | A1 | * | 3/2006 | Guo .......................... 219/121.84 |
| 2006/0067830 | A1 | * | 3/2006 | Guo et al. ................. 416/229 R |
| 2006/0090336 | A1 | * | 5/2006 | Graham et al. .............. 29/889.1 |
| 2008/0178994 | A1 | * | 7/2008 | Qi et al. ........................ 156/245 |

FOREIGN PATENT DOCUMENTS

| DE | 287894 | 10/1915 |
| DE | 19909390 | 11/2000 |
| DE | 102005058172 | 6/2007 |
| EP | 1476272 | 11/2004 |

OTHER PUBLICATIONS

German Search Report dated Sep. 28, 2009 from counterpart German patent application.

* cited by examiner

*Primary Examiner* — Evan Pert
(74) *Attorney, Agent, or Firm* — Timothy J. Klima; Shuttleworth & Ingersoll, PLC

(57) ABSTRACT

An arrangement for the repair of BLISK blades damaged at their leading and trailing edges by use of laser deposition welding, includes a laser source and laser optics for generating a focused laser beam (26) and a powder line (35) connected to a powder reservoir for supplying metal powder to be melted by the laser beam to the weld area. A modular, tubularly elongated welding apparatus (7) with a connection module (13) which is connected to a laser source and in which the entering laser beam is deflected in longitudinal direction and parallelized, and to the one side of the connection module (13) is connected to a camera module for a CCD camera (12) enabling the precise positioning of the welding apparatus and the deposition of the molten metal powder on the respective blade to be monitored and controlled.

20 Claims, 4 Drawing Sheets

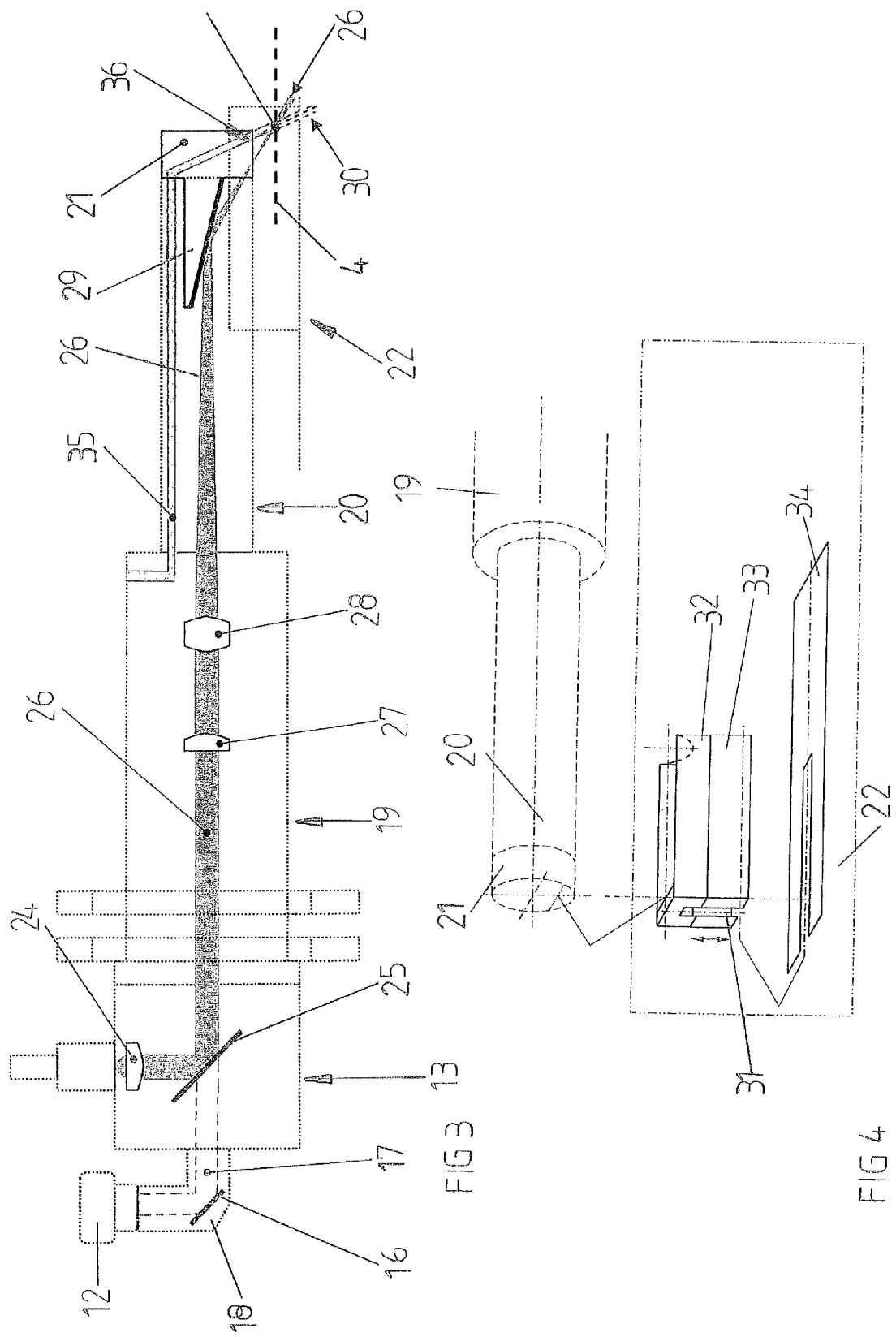

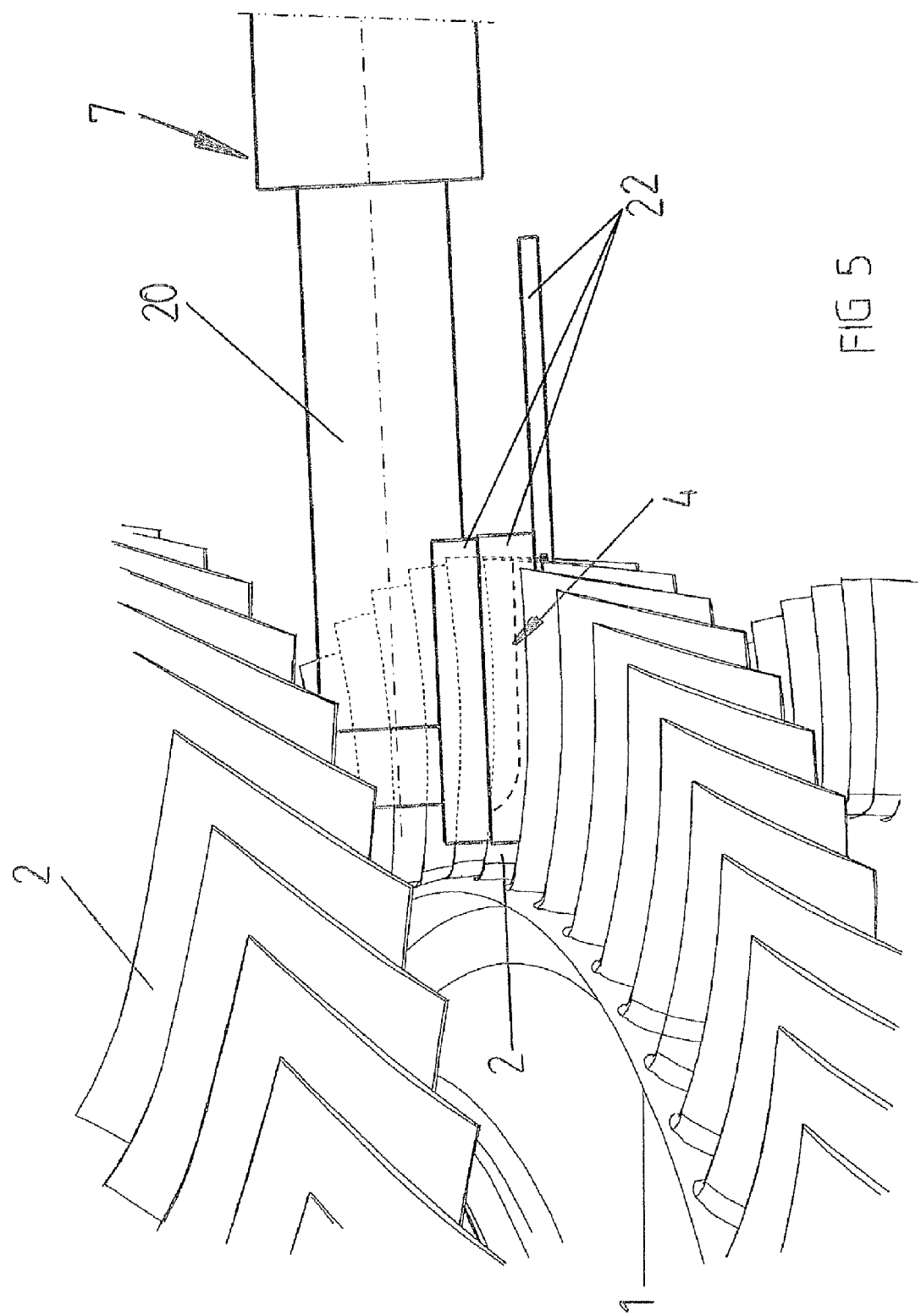

Figure 1:
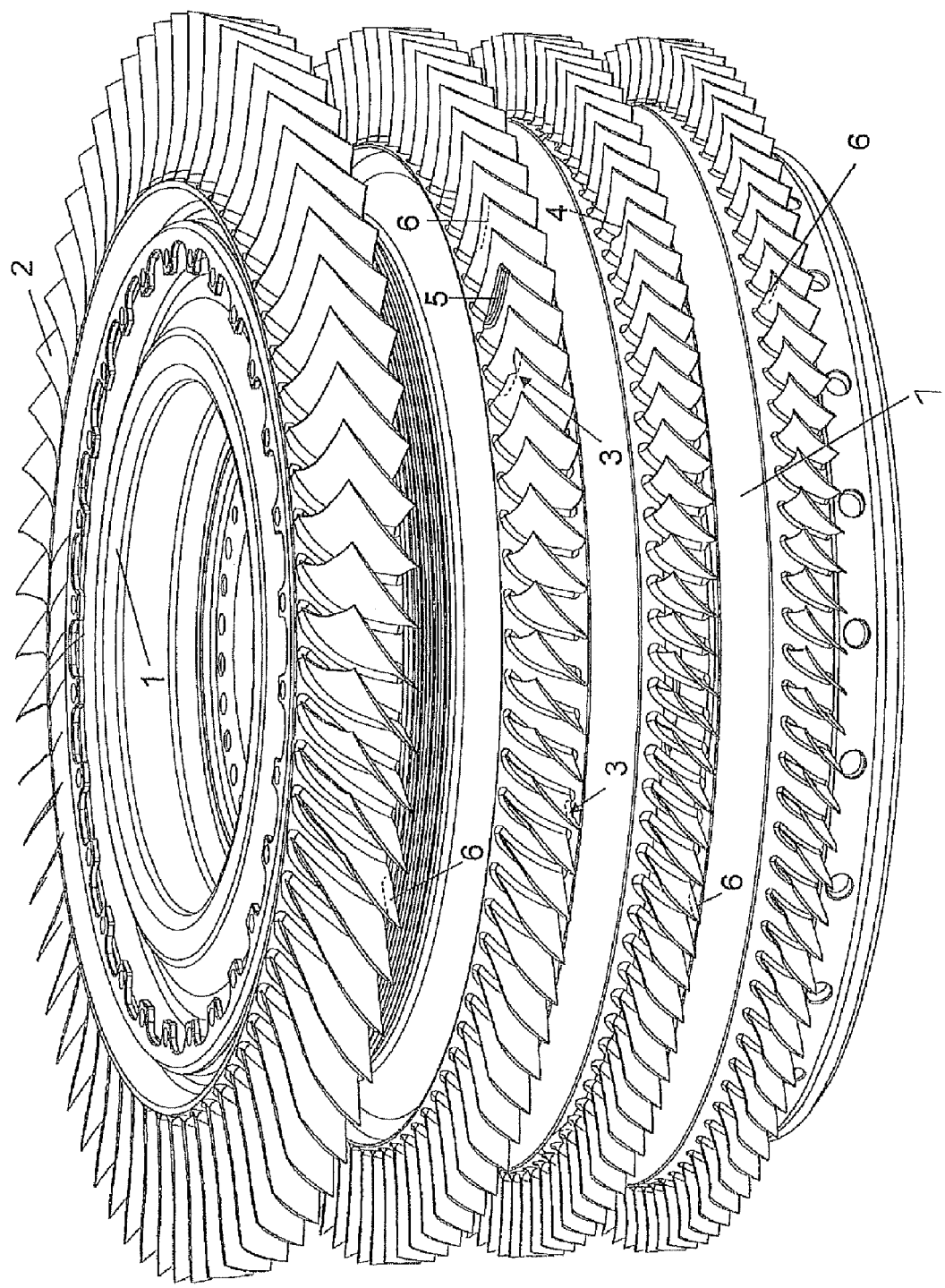

ARRANGEMENT FOR THE REPAIR OF THE BLADES OF BLISK DRUMS BY MEANS OF LASER DEPOSITION WELDING

This application claims priority to German Patent Application DE102009004661.5 filed Jan. 12, 2009, the entirety of which is incorporated by reference herein.

The present invention relates to an arrangement for the repair of the blades of BLISK drums for gas turbines by laser deposition welding, this arrangement including a laser source and laser optics for generating a focussed laser beam and a powder line connected to a powder reservoir for supplying the metal powder to be melted by the laser beam to the weld area.

As is known, the rotors of the compressors of gas-turbine engines are designed in weight-saving BLISK form, to provide for optimum flow guidance and high compressor efficiency. With this type of design, the blades are integrally formed onto the rotor disks. The rotor disks so produced are firmly joined to each other by welding or threaded connection to form rotor drums. For the repair of the blades, which are highly loaded by sand and dust or the impact of foreign objects, e.g. stones, in particular at the leading and trailing edges and at the tips, it is already known to remove the damaged blade area by cutting/machining, fill it by deposition welding and subsequently re-machine it to the specified dimension. From Specification U.S. Pat. No. 5,038,014, a method for the repair of blades by laser deposition welding is known in which, starting out from the blade tips, the damaged blade area is removed and the removed stock replaced by laser deposition welding up to the blade tip. This is followed by the usual mechanical machining process to produce the finished dimension and by a heat-treatment process. The arrangement provided for laser deposition welding includes an argon-charged power reservoir from which the powder material is fed via a cooled exit port to the weld area and a laser source with laser optics to generate an appropriately shaped laser beam for melting the powder material. While permitting BLISK blades to be repaired from the tip by laser deposition welding, such an arrangement, due to the close proximity of the blades of adjacent stages in a BLISK design compressor drum, the high space requirement of the known laser deposition welding arrangement and the unprotected exposure of the welding process to the surrounding atmosphere, is unsuitable for performing high-quality repair of the damaged areas at the leading and trailing edges of the blades of a BLISK drum.

A broad aspect of this invention is to provide an arrangement for the repair of the blades of BLISK drums by laser deposition welding which enables blade repair to be performed in high quality at the blade leading and trailing edges in the confined space between adjacent compressor stages.

The present invention, in essence, provides a modular, tubularly elongated welding apparatus with a connection module which is connected to a laser source and in which the entering laser beam is deflected in longitudinal direction and parallelized. Connected to the one side of the connection module is a camera module for a CCD camera enabling the precise positioning of the welding apparatus and the deposition of the molten metal powder on the respective blade to be monitored and controlled. Adjoining the side of the connection module opposite the camera module is a beam-shaping module for further shaping and focussing the laser beam and a slender welding-head module, with the laser beam and a powder line connected to the weld powder feeder extending in longitudinal direction of said welding-head module and being directed in a deposition head towards a sideward exit port. Adjoining the exit port is a protective-gas shielding module which, being connected to a protective-gas source and forming an open protective-gas duct, encloses the metal deposit applied to the blade edge with protective gas, thereby protecting said deposit against contamination during melting and cooling. The arrangement so designed enables repairs of the correspondingly prepared leading and trailing edges of damaged blades to be performed by laser deposition welding with high precision and quality of deposition, despite the close proximity of two adjacent stages of a BLISK drum.

According to a further feature of the present invention, the protective-gas shielding module includes a fixed duct portion arranged on the welding-head module and an exchangeable, mobile duct portion suited to the respective blade shape and size as well as a slotted sliding element temporarily attached to the blade to be repaired and bearing the welding apparatus with the protective-gas shielding module during the deposition process. Thus, the weld area is virtually enclosed by protective gas, nearly excluding contamination of the weld material during deposition, melting and cooling.

In development of the present invention, collimating and focussing lenses for beam-shaping and focussing, which can be cooled via a cooling circuit connected to a water source, are arranged in the connection and beam-shaping module.

In further development of the present invention, also the beam-shaping module is connected to the protective-gas source to prevent the optical elements of the welding apparatus from being contaminated.

In development of the present invention, deflecting mirrors arranged in the connection module and in the welding-head module for deflecting the laser beam and a mirror for deflecting the white-light beam to the CCD camera are provided.

In a further embodiment of the present invention, a fixation element for attaching the welding apparatus to an industrial robot or the like is provided on the connection module or the beam-shaping module.

In a further embodiment of the present invention, a light-fiber connector for coupling out the laser light into the connection module is provided which is connected to the latter and via a light-fiber cable (15) to the laser source.

The present invention is more fully described in light of the accompanying drawings showing a preferred embodiment. In the drawings, FIG. 1 is a perspective representation of a compressor drum in BLISK design for an aircraft gas turbine with some blades being damaged at the leading or trailing edge, FIG. 2 is a schematic representation of an arrangement for repairing the blades of a BLISK drum by laser deposition welding, FIG. 3 is an arrangement in accordance with FIG. 2 with a representation of the beam routings within the arrangement, FIG. 4 is a schematic representation of the arrangement for shielding the deposition-welding area by protective gas, and FIG. 5 is a partial view of a welding apparatus during laser deposition welding at a damaged blade leading edge.

The four-stage BLISK drum shown in FIG. 1 includes four rotor disks 1 firmly connected to each other and each being provided on their outer circumference with integrally formed-on blades 2, some of which showing damaged areas 3 at the leading and trailing edges due to foreign object impact. For repairing the damaged blades by laser deposition welding, the damaged areas 3 are milled out, thereby producing a removal area 4. On the damaged blade so prepared, the arrangement for laser deposition welding described hereinafter is positioned to deposit, under a protective-gas shield, several layers of a molten metal powder suiting the blade material onto the removal area 4 of the blade leading or trailing edge, thereby producing the deposition area 5 shown in FIG. 1 for a damaged area of a blade trailing edge. This deposition area 5 is then mechanically machined, finally producing a repair area 6. In this manner, all damaged blades shall be repaired in high quality.

Figure 2:
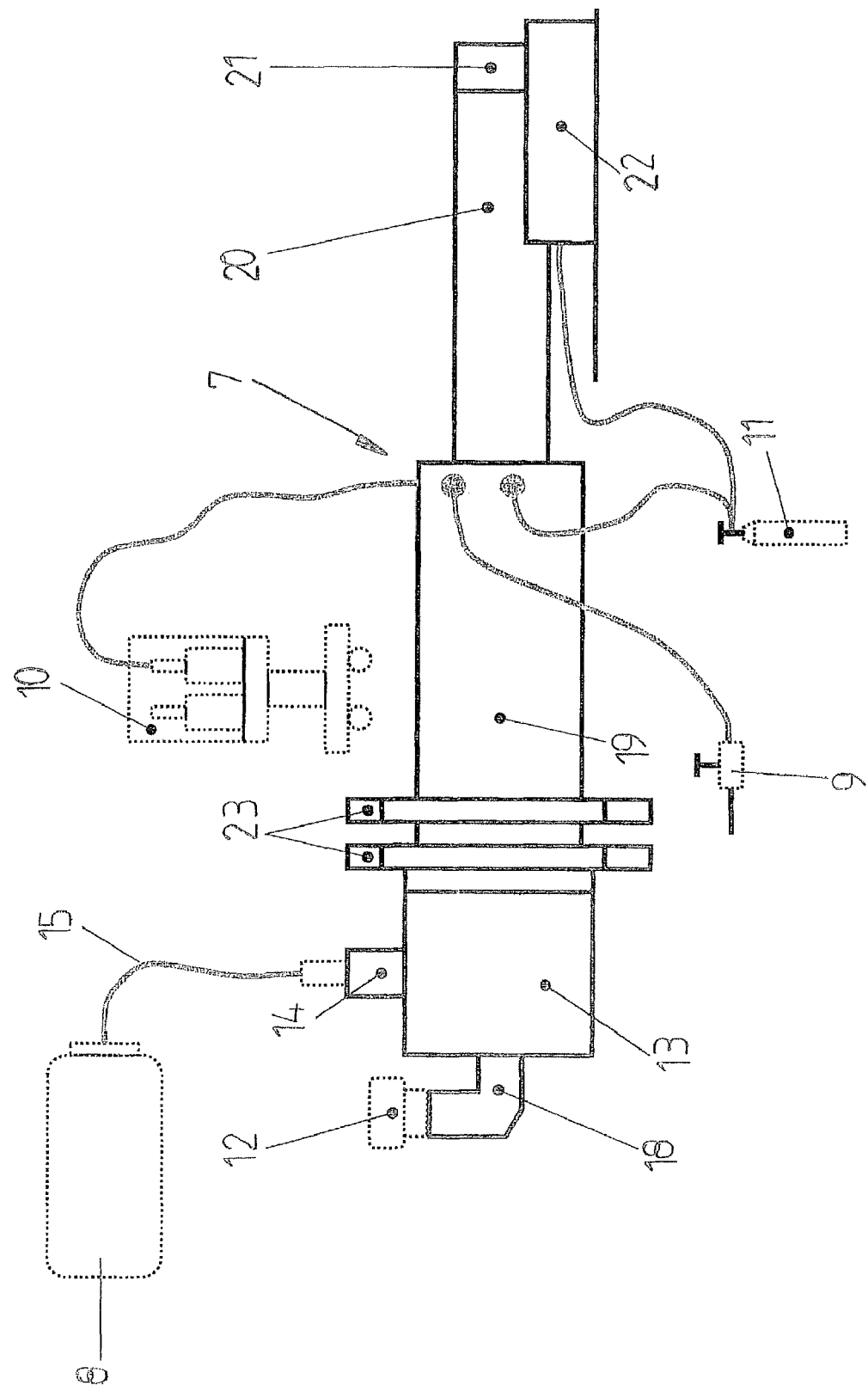

The arrangement for laser deposition welding of pre-machined, damaged blade edges shown in FIGS. 2 and 3 includes a multi-modular welding apparatus 7 which is to be positioned on the blade 2 to be processed (see FIG. 5) and, according to FIG. 2, is associated with a laser source 8, a water source 9, a weld powder feeder 10, a protective-gas source 11 and a CCD camera 12. Connected to the laser source 8 via a light-fiber connector 14 and a light-fiber cable 15 is a connection module 13 which is the interface element to, firstly, a camera module 18 provided with a mirror 16 for deflecting a white-light beam 17 to the CCD camera 12 and, secondly, a beam-shaping module 19 adjoined by a narrow welding-head module 20 provided at its free end with a deposition head 21 having a sideward exit port 36 and a mobile protective-gas shielding module 22. Connected to the beam-shaping module 19 is a fixation element 23 for fixing the welding apparatus 7 to an industrial robot or another NC manipulating system (not shown). Connected to the beam-shaping module 19 are both the weld powder feeder 10 and the water source 9. The protective-gas source 11 is connected to both the beam-shaping module 19 and the protective-gas shielding module 22.

Using the CCD camera 12, the modular welding apparatus 7 is positioned positionally correct on the blade to be repaired and traversed over the respective blade edge (removal area 4), while the deposition of the weld layers is simultaneously controlled.

The laser beam entering the connection module 13 is, via optics formed by a first collimating lens 24 and a first deflecting mirror 25, parallelized and deflected into the beam-shaping module 19 in which the laser beam 26 is again parallelized by a second collimating lens 27 and subsequently focussed by a focussing lens 28 and deflected by a second deflecting mirror 29 towards the metal powder jet 30 supplied in the welding-head module 20 via a powder line 35 and impinging on the blade edge to be built up. Both the metal powder jet 30 supplied via the powder line 35 and the laser beam 26 are deflected within the deposition head 21 towards the sideward exit port 36 thereof, with the metal powder being melted on the blade edge to be built up and several, overlying metal layers being deposited along the removal area 4 of the damaged blade to fill the removal area 4.

Arranged on the deposition head 21 is the protective-gas shielding module 22 with a protective-gas duct 31 which is open at the free end to accommodate the blade portion to be repaired and is connected to the protective-gas source 11. The protective-gas duct 31 is open towards the exit port 36 of the deposition head 21, enabling the molten metal powder to be deposited on the respective blade edge, actually in a protective-gas atmosphere provided in the protective-gas duct 31. The protective-gas shielding module 22 includes a duct portion 32 firmly connected to the deposition head 21, a mobile duct portion 33 exchangeably arranged thereon and adaptable to different blade sizes, and a sliding element 34 provided with a slot corresponding to the duct opening or the blade edge, respectively. The protective-gas shielding module 22 is guided on the sliding element 34 attached to the blade to be repaired as the welding apparatus 7 advances during deposition of the molten metal powder. Accordingly, the molten metal powder layer lies in a local protective-gas atmosphere during deposition and cooling, thereby avoiding or at least reducing contamination of the deposited material. As shown in FIG. 3, the protective-gas source 11 is also connected to the beam-shaping module 19, so that contaminations within the welding apparatus, in particular of the lenses and deflecting mirrors, are avoided. The beam-shaping and focussing lenses arranged in the connection and beam-shaping modules 13, 19 are cooled by a cooling circuit connected to the water source 9.

The above-described welding apparatus 7, which in its forward part is provided with the narrow welding-head module 20 in which the welding beam 26 and the metal powder jet 30 run parallelly and deflect to a sideward exit port 36 with adjoining protective-gas shielding module 22, ensures good accessibility to the leading and trailing edges of the blades under local protective-gas shielding even in the confined space between the adjacent blade rows of a BLISK drum, enabling the blades of BLISK drums to be repaired easily, in high quality and with relatively low investment and effort.

LIST OF REFERENCE NUMERALS

1 Rotor disks
2 Blades
3 Damaged area of 2
4 Removal area of 2
5 Deposition area
6 Repair area
7 Welding apparatus
8 Laser source
9 Water source
10 Weld powder feeder
11 Protective-gas source
12 CCD camera
13 Connection module
14 Light-fiber connector
15 Light-fiber cable
16 Mirror
17 White-light beam
18 Camera module
19 Beam-shaping module
20 Welding-head module
21 Deposition head
22 Protective-gas shielding module
23 Fixation element
24 First collimating lens
25 First deflecting mirror
26 Laser beam
27 Second collimating lens
28 Focussing lens
29 Second deflecting mirror
30 Metal powder jet
31 Open protective-gas duct
32 Fixed duct portion
33 Mobile duct portion
34 Slotted sliding element
35 Powder line
36 Sideward exit port

What is claimed is:

1. An arrangement for repairing blades of BLISK drums for gas turbines by laser deposition welding, comprising:
   a laser source and laser optics for generating a focused laser beam;
   a powder line connected to a powder reservoir for supplying a metal powder jet to a weld area to be melted by the laser beam;
   a welding apparatus of modular type, including
   a connection module which is connected to the laser source and in which the entering laser beam is shaped and deflected, a camera module connected to one side of the connection module for a CCD camera, and a beam-shaping module connected at an opposite side for shaping and focusing the laser beam, and a slender welding-head module adjoining the beam-shaping module with the laser beam and the powder line extending in longitudinal direction of said welding-head module and being directed in a deposition head towards a sideward exit port, and a protective-gas shielding module adjoining the exit port and being connected to a protective-gas source, forming an open protective-gas duct to protect a metal deposit applied to the blade edge against contamination during melting and cooling.

2. The arrangement of claim 1, wherein the protective-gas shielding module includes a fixed duct portion arranged on the welding-head module and an exchangeable, mobile duct portion suited to a respective blade shape and size as well as a slotted sliding element temporarily attached to the blade to be repaired and bearing the welding apparatus with the protective-gas shielding module during the deposition process.

3. The arrangement of claim 2, and further comprising collimating and focusing lenses positioned in the connection and beam-shaping module for beam-shaping and focussing as well as a cooling circuit connected to a water source for cooling the lenses.

4. The arrangement of claim 3, wherein the beam-shaping module is connected to the protective-gas source to prevent optical elements of the welding apparatus from being contaminated.

5. The arrangement of claim 4, and further comprising deflecting mirrors arranged in the connection module and in the welding-head module for deflecting the laser beam, and a mirror for deflecting the white-light beam to the CCD camera.

6. The arrangement of claim 5, and further comprising a fixation element provided on one of the connection module and the beam-shaping module for attaching the welding apparatus to an industrial robot.

7. The arrangement of claim 6, and further comprising a light-fiber connector provided on the connection module for coupling the laser light into the connection module, the light-fiber connector being connected to the laser source via a light-fiber cable.

8. The arrangement of claim 1, and further comprising collimating and focusing lenses positioned in the connection and beam-shaping module for beam-shaping and focussing as well as a cooling circuit connected to a water source for cooling the lenses.

9. The arrangement of claim 8, wherein the beam-shaping module is connected to the protective-gas source to prevent optical elements of the welding apparatus from being contaminated.

10. The arrangement of claim 9, and further comprising deflecting mirrors arranged in the connection module and in the welding-head module for deflecting the laser beam, and a mirror for deflecting the white-light beam to the CCD camera.

11. The arrangement of claim 10, and further comprising a fixation element provided on one of the connection module and the beam-shaping module for attaching the welding apparatus to an industrial robot.

12. The arrangement of claim 1, and further comprising a light-fiber connector provided on the connection module for coupling the laser light into the connection module, the light-fiber connector being connected to the laser source via a light-fiber cable.

13. The arrangement of claim 12, wherein the beam-shaping module is connected to the protective-gas source to prevent optical elements of the welding apparatus from being contaminated.

14. The arrangement of claim 13, and further comprising deflecting mirrors arranged in the connection module and in the welding-head module for deflecting the laser beam, and a mirror for deflecting the white-light beam to the CCD camera.

15. The arrangement of claim 14, and further comprising a fixation element provided on one of the connection module and the beam-shaping module for attaching the welding apparatus to an industrial robot.

16. The arrangement of claim 15, and further comprising a light-fiber connector provided on the connection module for coupling the laser light into the connection module, the light-fiber connector being connected to the laser source via a light-fiber cable.

17. The arrangement of claim 1, wherein the beam-shaping module is connected to the protective-gas source to prevent optical elements of the welding apparatus from being contaminated.

18. The arrangement of claim 1, and further comprising deflecting mirrors arranged in the connection module and in the welding-head module for deflecting the laser beam, and a mirror for deflecting the white-light beam to the CCD camera.

19. The arrangement of claim 1, and further comprising a fixation element provided on one of the connection module and the beam-shaping module for attaching the welding apparatus to an industrial robot.

20. The arrangement of claim 1, and further comprising a light-fiber connector provided on the connection module for coupling the laser light into the connection module, the light-fiber connector being connected to the laser source via a light-fiber cable.

* * * * *